United States Patent
Raffaelli

(10) Patent No.: US 11,319,016 B2
(45) Date of Patent: May 3, 2022

(54) MOTORCYCLE FRONT SUSPENSION

(71) Applicant: PIAGGIO & C. S.P.A., Pontedera (IT)

(72) Inventor: Andrea Raffaelli, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 70 days.

(21) Appl. No.: 17/044,167

(22) PCT Filed: Apr. 19, 2019

(86) PCT No.: PCT/IB2019/053261
§ 371 (c)(1),
(2) Date: Sep. 30, 2020

(87) PCT Pub. No.: WO2019/207445
PCT Pub. Date: Oct. 31, 2019

(65) Prior Publication Data
US 2021/0031867 A1  Feb. 4, 2021

(30) Foreign Application Priority Data

Apr. 27, 2018  (IT) .................. 102018000004941

(51) Int. Cl.
*B62K 25/08* (2006.01)
*B62K 25/16* (2006.01)
*B62K 21/02* (2006.01)

(52) U.S. Cl.
CPC ............. *B62K 25/08* (2013.01); *B62K 21/02* (2013.01); *B62K 25/16* (2013.01); *B60G 2300/12* (2013.01); *B62K 2202/00* (2013.01)

(58) Field of Classification Search
None
See application file for complete search history.

(56) References Cited

U.S. PATENT DOCUMENTS 4,180,280 A * 12/1979 Doveri ................ B62K 25/005
                                                            188/26
4,520,892 A *  6/1985 Satoh .................... B62K 11/00
                                                            280/282

(Continued)

FOREIGN PATENT DOCUMENTS

CN      102963476 A       3/2013
CN      106627946 A  *    5/2017

(Continued)

OTHER PUBLICATIONS

International Search Report and Written Opinion for corresponding PCT/IB2019/053261, dated Jul. 8, 2019, 14 pages.

*Primary Examiner* — Kevin Hurley
*Assistant Examiner* — Hosam Shabara
(74) *Attorney, Agent, or Firm* — Armstrong Teasdale LLP

(57) ABSTRACT

A motorcycle front suspension includes a fork having a steering member mechanically connected or adapted to be connected to a handlebar of a motorcycle, and an oscillating arm having a first end and a second end. The motorcycle front suspension also includes a rod having a first end, pivotally joined to the steering member, and having a second end pivotally joined to the first end of the oscillating arm, and a shock absorber group, including a spring and a damper, the shock absorber group extending from an attachment head, mechanically connected to the steering member, to an attachment foot, pivotally joined to the second end of the oscillating arm.

13 Claims, 4 Drawing Sheets

(56) References Cited

U.S. PATENT DOCUMENTS

| | | | | |
|---|---|---|---|---|
| 6,457,732 B2* | 10/2002 | Ito | ............................ | B62K 25/08 |
| | | | | 280/277 |
| 9,227,662 B2* | 1/2016 | Bartolozzi | ................ | B62K 5/10 |
| 9,682,742 B2* | 6/2017 | Rosellini | ................. | B62K 25/12 |
| 2020/0062330 A1* | 2/2020 | Angelin | ................. | B62K 25/00 |

FOREIGN PATENT DOCUMENTS

| | | | |
|---|---|---|---|
| DE | 808191 | C | 7/1951 |
| EP | 2996929 | B1 | 3/2017 |
| EP | 3150477 | A1 | 4/2017 |
| JP | H01145691 | U | 10/1989 |
| WO | 8701670 | A1 | 3/1987 |

\* cited by examiner

MOTORCYCLE FRONT SUSPENSION

CROSS-REFERENCE TO RELATED APPLICATIONS

This application is a National Stage Application of International Patent Application No. PCT/IB2019/053261, having an International Filing Date of Apr. 19, 2019, which claims the benefit of priority to Italian Patent Application No. 102018000004941, filed Apr. 27, 2018, the entire contents of which are hereby incorporated by reference herein.

TECHNICAL FIELD OF THE INVENTION

The present invention relates to the technical field of suspensions for transport vehicles, and relates in particular to a motorcycle front suspension.

BACKGROUND OF THE INVENTION

In the field of motorcycles, and in particular of mopeds, it is known to use an oscillating arm type suspension on the forecarriage.

In particular, it is a single arm, hence asymmetric, system comprising a single rigid arm fork, also named steering arm, on which an oscillating arm pivots, which ends on the pin of the front wheel.

The steering arm is mechanically connected to the steering of the motorcycle.

Furthermore, the shock absorber group, which typically comprises a spring and a damper, also engages the oscillating arm.

The shock absorber group mechanically connects the single rigid arm fork and the front wheel pin to each other.

Usually, the shock absorber group is rigidly connected to the front wheel pin and to the fork: typically, the attachment foot, or lower end of the shock absorber group, is connected to the wheel pin by means of a rigid bracket. However, solutions are known, e.g. such as the one described in European patent EP2996929B1, in which the attachment foot is connected to the front wheel pin in non-rigid manner.

The oscillating arm front suspensions of the prior art described above have the drawback of not reacting in optimum manner to loads, being characterized by a marked pro-dive or anti-dive effect, defined by the trajectory run by the instantaneous center of rotation of the wheel assembly with the diving of the suspension so that the contact point of the tire with the ground also follows a complex trajectory.

The general object of the present disclosure is to provide a front suspension which can overcome the aforesaid drawback, totally or at least in part.

Such object is achieved by a motorcycle front suspension as defined in general in claim 1. Preferred and advantageous embodiments of the aforesaid motorcycle suspension are defined in the accompanying dependent claims.

The invention will be better understood from the following detailed description of particular embodiments, provided by way of example and consequently not limiting in any manner, with reference to the accompanying drawings which are briefly described in the following paragraph.

DETAILED DESCRIPTION

Figure 1:
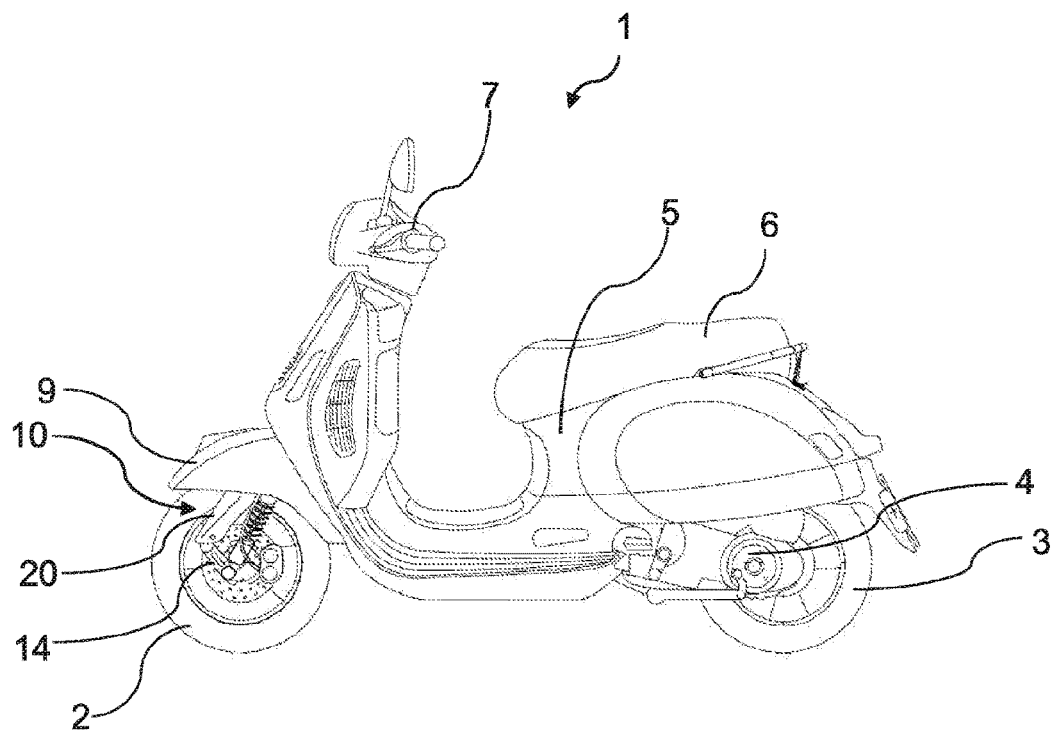
FIG. 1 shows a side view of a non-limiting example of embodiment of a motorcycle comprising a front suspension.
Figure 2:
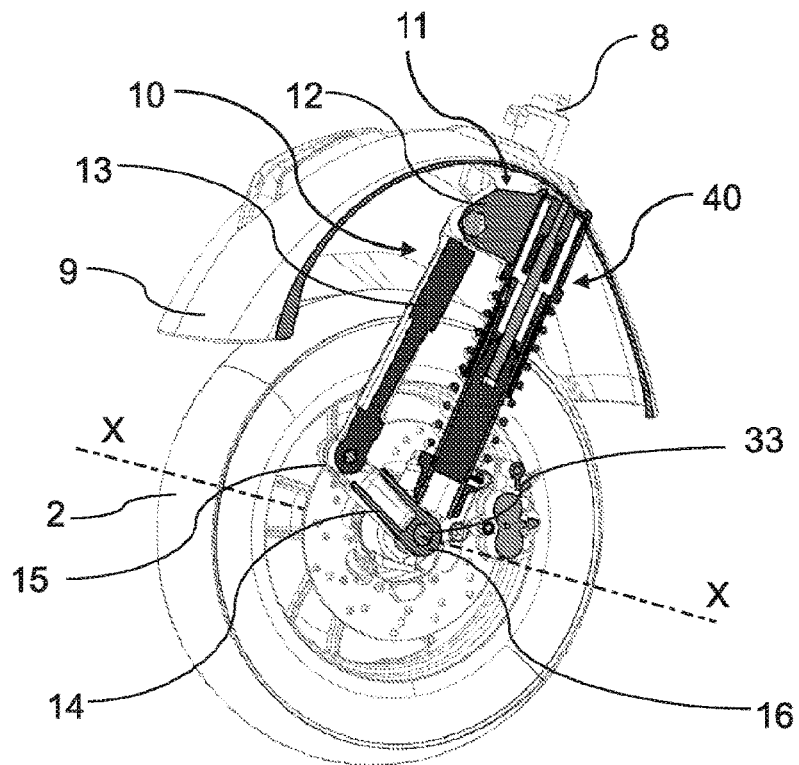
FIG. 2 shows a three-dimensional partial section view of a part of the motorcycle of FIG. 1 in which the motorcycle front suspension is shown in greater detail.

Similar or equivalent elements in the accompanying figures are indicated by means of the same reference numbers.

The annexed figures show an embodiment of a transport vehicle and in particular of a motorcycle 1. In the particular example shown in the figures, without thereby introducing any limitation, the motorcycle 1 is a scooter, comprising a front wheel 2 and a rear wheel 3, a traction engine 4, a supporting frame 5, a saddle 6, a steering handlebar 7 rotationally attached to the supporting frame 5.

The motorcycle 1 further comprises a steering tube 8 fixed to the steering handlebar 7 so as to rotate integrally therewith. The motorcycle 1 further comprises a front mudguard 9, preferably fixed either directly or indirectly to the steering tube 8 so as to rotate integrally therewith.

The motorcycle 1 further comprises a motorcycle front suspension 10 adapted and configured to secure the front wheel 2 to the steering tube 8, so that said front suspension 10 is operatively interposed between the steering tube 8 and the front wheel 2. In the particular example shown in FIG. 1, without thereby introducing any limitation, part of the front suspension 10 is covered by a covering hood 20 substantially for needs of appearance. This covering hood was removed in the remaining FIGS. 2-5.

The traction engine 4 is either directly or indirectly operatively connected to a driving wheel of the motorcycle 1, in the example to the rear wheel 3.

According to an embodiment, the traction engine 4 is an internal combustion engine. According to an alternative embodiment, the traction engine 4 is an electric or hybrid engine.

Reference numeral 10 indicates as a whole a motorcycle front suspension comprising a fork 11 having a steering member 12, mechanically connected or adapted to be connected to the steering handlebar 7 of the motorcycle 1. For example and without limitation the steering member 12 is a bar or a plate. In the particular non-limiting example shown in the figures, the fork 11 has a top end portion mechanically coupled to the steering tube 8 so as to be able to rotate integrally therewith.

The front motorcycle suspension 10 further comprises:
- an oscillating arm 14 having a first end 15 and a second end 16;
- a rod 13 having a first end, pivotally joined to the steering member 12, and having a second end pivotally joined to the first end 15 of the oscillating arm 14.

The rod 13 is, for example, a cylindrical or substantially cylindrical rod made of metallic material, e.g. steel or aluminum. The rod 13 may also be a rod with a quadrangular or rectangular, or substantially rectangular or quadrangular, cross-section.

It is worth noting that although the steering member 12 is shown as a flattened bar of reduced length, such member may also be a bar or an arm or a rod having for example a length such as to protrude with respect to a remaining portion of the fork 11, and be, for example, a straight projecting bar having a quadrangular or circular cross-section, etc.

The motorcycle front suspension 10 further comprises a shock absorber group 40, comprising a spring 43 and a damper 50, said shock absorber group 40 extending from an attachment head 41, mechanically connected to the steering member 12, to an attachment foot 42, pivotally joined to the second end 26 of the oscillating arm 14. In other words, it is worth noting that the steering member 12 either forms part or constitutes a first branch of the fork 11 and the attachment head 41 either forms part or constitutes a second branch of the fork 11. The third branch of the fork 11 is defined by the top portion connected to the steering tube 8.

For example, the spring 43 is a helical spring interposed between the attachment head 41 and the attachment foot 42 of the shock absorber group 40 in order to apply an elastic thrust force which tends to move the attachment head 41 and the attachment foot 42 apart. The spring 43 preferably surrounds the damper 50.

In accordance with an embodiment, the oscillating arm 14 carries a rotation pin 33 of the associable front wheel 2 of the motorcycle 1. Such rotation pin 33 defines a rotation axis X-X for the front wheel 2. Preferably, such rotation pin 33 has an end portion forcibly engaged and locked by interference within a housing formed inside the second end portion of the oscillating arm 14. More preferably, the rotation pin 33 is locked in said housing so as to prevent a rotation of the rotation pin 33 with respect to the oscillating arm 14.

According to an embodiment, the steering member 12 cantilevers with respect to the fork 11 so that the median longitudinal plane of the associable front wheel 2 passes on the fork axis. As an alternative, the steering member 12 can be substantially null and the rod 13 may be connected at the sliding axis of the shock absorber group 40, for example the rod 13 can be connected as closer as possible to the attachment head 41, for example immediately above or beside the attachment head 41. In the above alternative way, the branch defined by the shock absorber group 40, the branch defined by the oscillating arm 14 and the branch defined by the rod 13 form are closed together so as to form a triangle instead of a quadrilateral.

Figure 5:
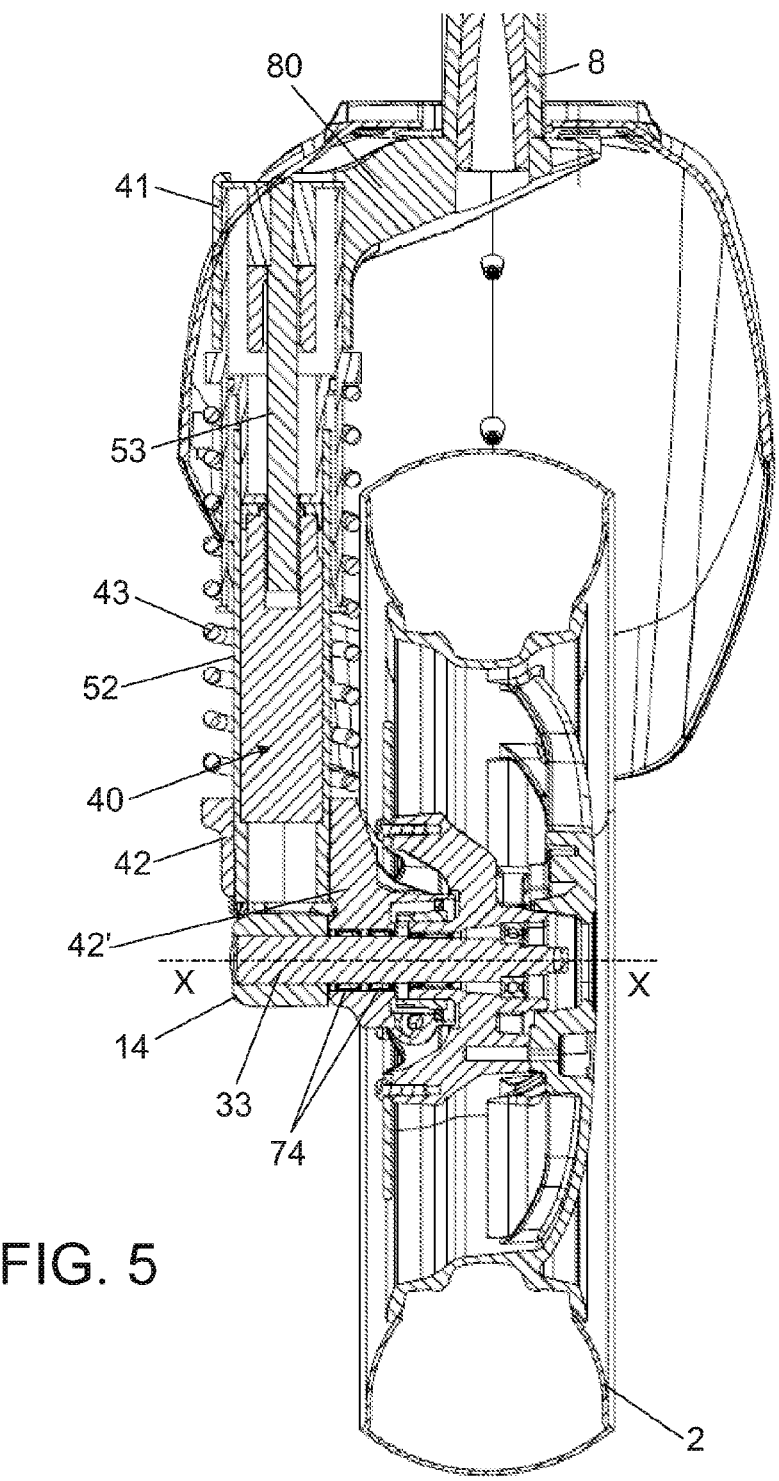
FIG. 5 shows a section view of the suspension mounted on a front wheel.

In an advantageous way, the attachment foot 42 of the shock absorber group 40 is rotatably and slidingly connected on the rotation pin 33 (FIG. 5). In such a way the attachment foot 42 and therefore the shock absorber group 40 are axially unconstrained from the rotation pin 33. This allows to prevent that transversal forces, that is to say force directed orthogonally with respect to the plane of the wheel 2, stress the same shock absorber group 40. In fact such a kind of stresses through said sliding coupling are absorbed and transferred to the oscillating arm 14 and to the rod 13. The shock absorber group is therefore unaffected by said stresses being more smooth along the straight trajectory of compression-expansion.

From the constructive point of view, the attachment foot 42 comprises a shaped portion 42' which is connected to the rotation pin 33.

Figure 3:
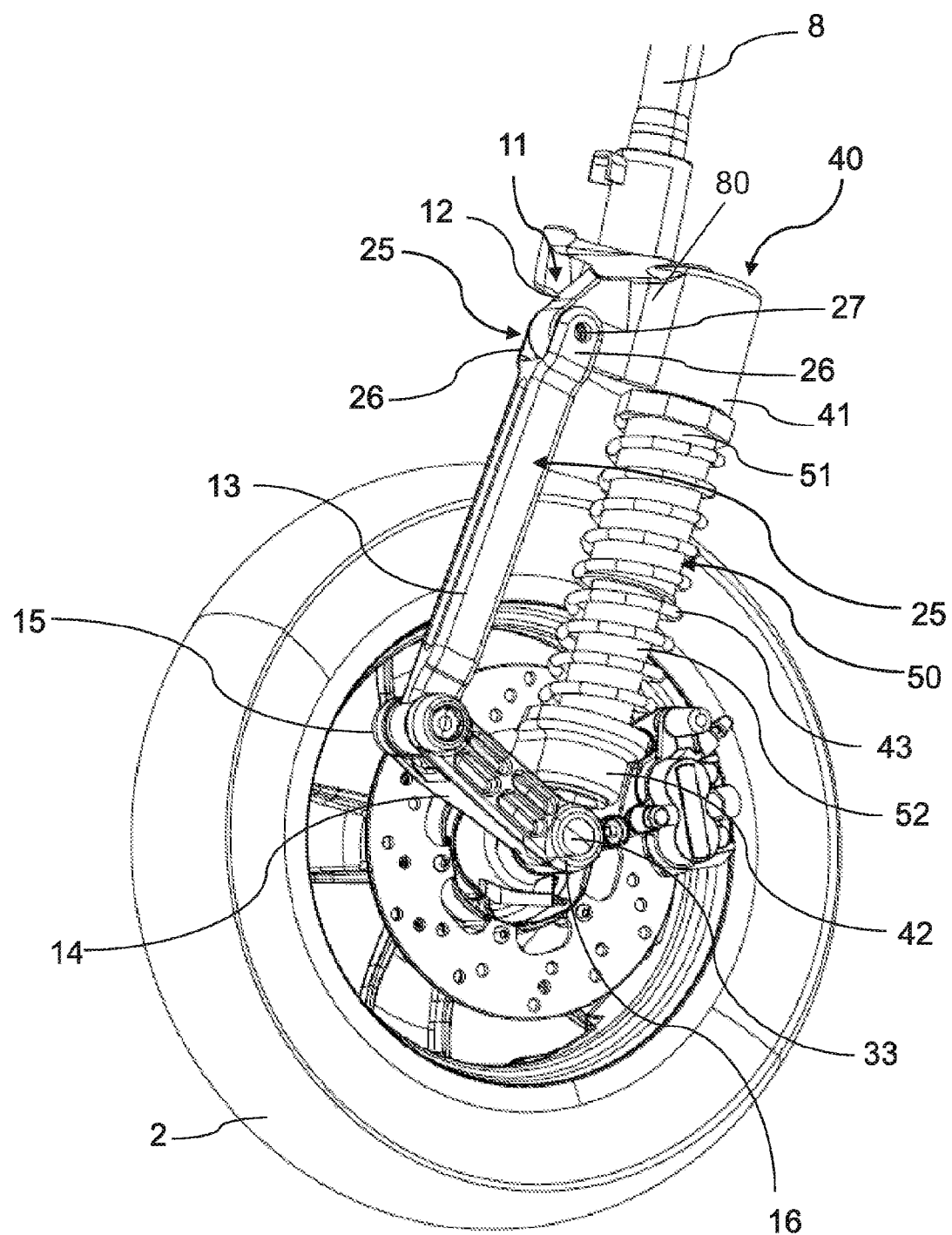
FIG. 3 schematically shows a three-dimensional view of the motorcycle front suspension.

Additionally, as shown in FIG. 3, the rod 13 is rotatably mounted at his first end portion at the attachment head 41 of the shock absorber group 40. In this way it results that the rod 13 has a length of about two times the oscillating arm 14. The rotatable connection of the rod 13 at the attachment head 41 of the shock absorber group 40 allows to transfer the transversal loads—through the arm 14 and the rod 13—to a more stable point of the fork 11 which falls outside the volume defined by the wheel 2, that is to say the monoblock 80 which constitutes a single connection piece between the shock absorber group 40 and the steering tube 8, besides the steering member 12.

Preferably, the rotation pin 33 protrudes from the oscillating arm 14 to engage inside a housing 73 defined in the attachment foot 42 and to cross through it completely so as to protrude from the opposite side with respect to the input side and to protrude from such housing so as to allow the engagement of the hub of the front wheel 2 on a projecting portion of the rotation pin 33.

According to an advantageous embodiment, at least one bearing 74 is operatively interposed between the rotation pin 33 and the housing 73, e.g. ball or roller bearings, preferably also accommodated inside the housing 73. In the particular example shown in FIG. 4, two bearings 74 arranged inside the housing 73 are provided without thereby introducing any limitation.

The bearing 74 and in particular the couple of bearings 74 allows the attachment foot 42 to rotate and to be slidingly free of moving along the axis X-X. The attachment foot 42 is therefore counterposed between the oscillating arm 14 and the abutment portion of the wheel 2.

According to an advantageous embodiment, the rotation axis X-X defined by rotation pin 33 is inclined with respect to a horizontal plane of a preset angle such that when the motorcycle front suspension 10 supports at least part of the weight of the motorcycle 1, the rotation axis X-X of the front wheel 2 is parallel to said horizontal plane. Such predetermined angle is preferably in the 0.5°-1.5° range and is, for example, equal to about 1°, e.g. equal to 1.15°.

According to an advantageous embodiment, the rod 13 is pivotally hinged or adapted to be pivotally hinged to said steering member 12 through coupling means which define a hinge axis substantially parallel to the rotation axis X-X of the front wheel 2. For example, the aforesaid coupling means comprise a connecting bracket 25 arranged at an end portion of the rod 13 and having two mutually parallel walls 26 and said hinge axis is perpendicular to said parallel walls 26.

In particular, the three hinge axes, that is to say the axis at the end portion of the rod 13 and the hinge axes of the oscillating arm are parallel each to other. Since the common axis between the shock absorber group 40 and he oscillating arm 14 is the rotation axis X-X of the wheel 2 (that is to say the wheel group formed by: rim, tire and disk of the brake) it follows that all the above axes are perpendicular to the median plane of the wheel 2.

The aforesaid connecting bracket 25 may be a piece fixed to the rod 13 or may be an element integrated in the rod 13 and forming a single piece therewith.

Preferably, a hinge pin 27 is inserted in the parallel walls 26 of the connecting bracket 25 and preferably said hinge pin 27 passes through a through hole formed in the steering member 12.

Figure 4:
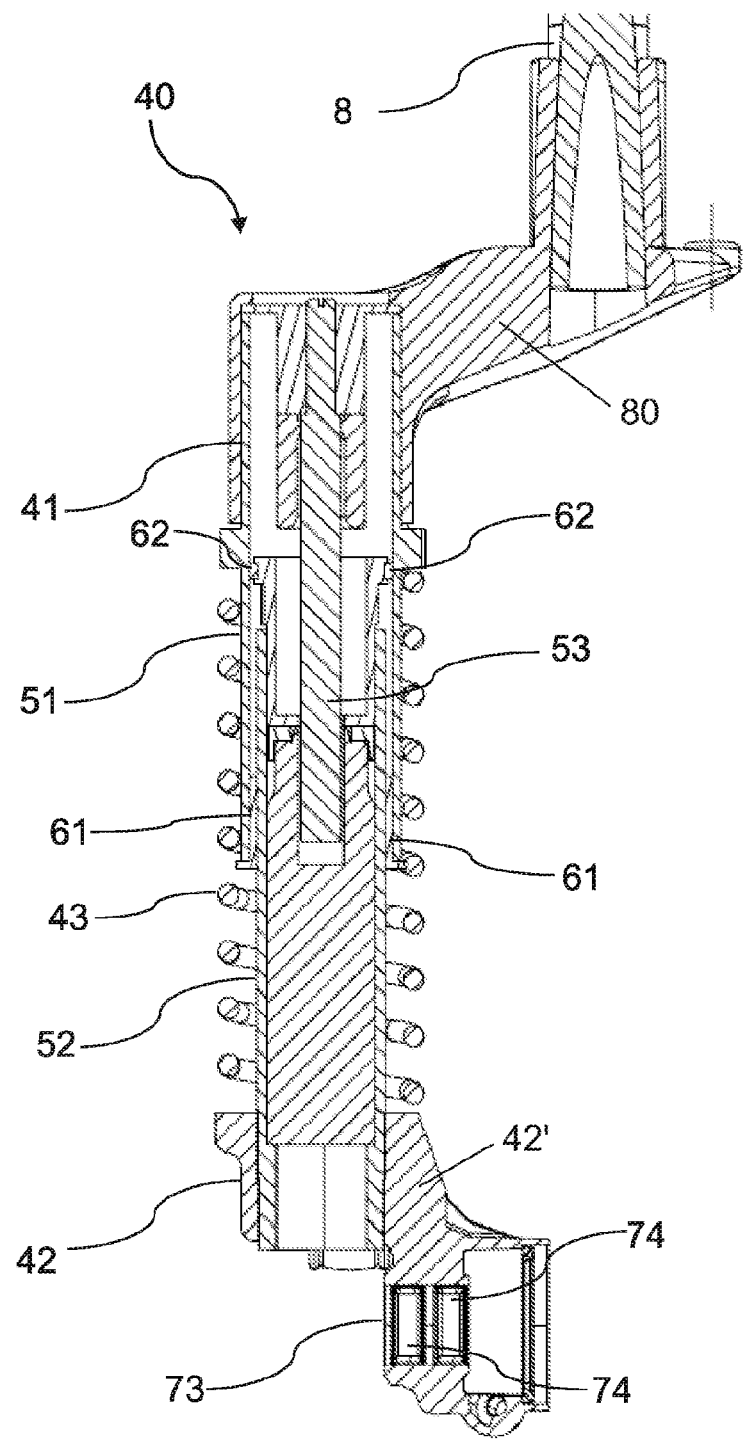
FIG. 4 shows a side section view of a shock absorber group of the motorcycle front suspension.

With reference to FIG. 4, according to a particularly advantageous embodiment, the damper 50 comprises:
  a first portion 51 connected to the attachment head 41 and
    a second portion 52 connected to the attachment foot
    42, wherein the first portion 51 and the second portion
    52 are adapted to slide relative to each other; and
  a third portion 53 surrounded by the first portion 51 and
    adapted to slide inside the second portion 52.

In such manner, the shock absorber group is "jacketed", i.e. provided with a cylindrical coupling which makes it possible to impose the linearity of the trajectory of the front wheel 2. Indeed, the first portion 51 is conveniently a jacket, the second portion 52 is a lining and the third portion 53 is a stem. Preferably, the damper 50 is a hydraulic damper.

Again with reference to FIG. 4, according to a particularly advantageous embodiment, the damper 50 comprises two bushings 61,62, e.g. two plastic bushings, operatively interposed between the first portion 51 and the second portion 52 of the damper 50, in which the said first portion 51 and said second portion 52 are adapted and configured to mutually slide on said bushings 61,62. One of such bushings, bushing 61 in the example, is preferably coupled to the first portion 51 to slide therewith with respect to the second portion 52 and on the second portion 52 and the other of such bushings, bushing 62 in the example, is preferably coupled to the second portion 52 to slide along it with respect to the first portion 51 and on the first portion 51.

Preferably, the aforesaid bushings 61,62 are axially spaced apart one from the other so as to define a distance between the two bushings 61,62. More preferably, said distance varies during the mutual sliding between the first portion 51 and the second portion 52 of the damper 50, in particular increasing with the sinking of the shock absorber group 40.

According to an advantageous embodiment, the aforesaid front suspension 10 may be provided on a motorcycle 1 having a front mudguard 9, comprising two lateral walls and a top wall interposed between said lateral walls, wherein said two lateral walls and said top wall delimit an internal space of said front mudguard 9 and wherein said first end of said rod 13 of the front suspension 10 is accommodated in the inner space of the mudguard. In such manner, the part of the suspension which forms the rotating union between the rod 13 and the steering member 12 is contained in a less exposed and more protected area, also allowing to limit the impact of appearance of this part of the motorcycle 1 having a nature which is strictly functional.

On the basis of the explanation above, it is thus possible to understand how a motorcycle front suspension of the type described above allows to achieve the purposes indicated above with reference to the prior art.

Indeed, the aforesaid motorcycle front suspension has an improved ability to react in optimum manner to loads allowing to reduce or eliminate the pro-dive or anti-dive effect of the oscillating arm front suspensions of the prior art.

Notwithstanding the principle of the invention, embodiments and details may be greatly varied with respect to that described and illustrated herein exclusively by way of non-limiting example without departing from the scope of protection of the invention as defined in the appended claims.

The invention claimed is:

1. Motorcycle front suspension comprising:
   a fork having a steering member mechanically connected or adapted to be connected to an handlebar of a motorcycle;
   an oscillating arm having a first end and a second end;
   a rod having a first end, pivotally joined to the steering member, and having a second end pivotally joined to the first end of the oscillating arm; and
   a shock absorber group, comprising a spring and a damper, the shock absorber group extending from an attachment head, mechanically connected to the steering member, to an attachment foot, pivotally joined to the second end of the oscillating arm;
   wherein the oscillating arm carries a rotation pin of an associable front wheel, the rotation pin defining a rotation axis (X-X) for the front wheel, and wherein the shock absorber group at the attachment foot is rotatably and slidingly coupled to the rotation pin.

2. The motorcycle front suspension according to claim 1, wherein the first end portion of the oscillating arm is rotatably joined to said steering member at the attachment head.

3. The motorcycle front suspension according to claim 1, wherein the rod is pivotally hinged or adapted to be pivotally hinged to the steering member through coupling means that define a hinge axis substantially parallel to the rotation axis (X-X).

4. The motorcycle front suspension according to claim 1, wherein the damper comprises:
   a first portion connected to the attachment head and a second portion connected to the attachment foot, wherein the first portion and the second portion are adapted to slide relative to each other; and
   a third portion surrounded by the first portion and adapted to slide inside the second portion.

5. The motorcycle front suspension according to claim 4, wherein the first portion is a jacket, the second portion is a lining, and the third portion is a stem.

6. The motorcycle front suspension according to claim 5, wherein the damper comprises two bushings operatively interposed between the first portion and the second portion, and wherein the first and second portion are adapted to slide relative to each other on the bushings.

7. The motorcycle front suspension according to claim 6, wherein the bushings are axially spaced apart one from the other so that a distance is defined between the two bushings.

8. The motorcycle front suspension according to claim 7, wherein the distance varies during the mutual sliding between the first portion and the second portion.

9. The motorcycle front suspension according to claim 2, wherein the rotation axis (X-X) is inclined with respect to a horizontal plane of a preset angle such that when the motorcycle front suspension supports at least part of a motorcycle weight, the rotation axis (X-X) is parallel to the horizontal plane.

10. The motorcycle front suspension according to claim 2, wherein the steering member cantilevers with respect to the fork so that the associable front wheel longitudinal plane passes on the fork axis.

11. Motorcycle comprising at least one motorcycle front suspension according to claim 1.

12. Motorcycle (1) The motorcycle according to claim 11, wherein the motorcycle comprises a front mudguard, comprising two lateral walls and a top wall interposed between the lateral walls, wherein the two lateral walls and the top wall delimit an internal space of the front mudguard, and wherein the first end of the rod is housed within the internal pace.

13. Motorcycle (1) The motorcycle according to claim 11, wherein the motorcycle is a scooter.

* * * * *